United States Patent Office 3,336,243
Patented Aug. 15, 1967

3,336,243
PHENOL-FORMALDEHYDE RESIN COMPOSITION
Walter L. Garrett, Freeland, Mich., assignor to The Dow Chemical Company, Midland, Mich., a corporation of Delaware
No Drawing. Filed Nov. 4, 1963, Ser. No. 321,295
16 Claims. (Cl. 260—2.5)

ABSTRACT OF THE DISCLOSURE

A $C_4$–$C_6$ alkadiene-acrylamide copolymer prepared and used as a dispersion in a liquid diol such as ethylene glycol is an effective additive for improving the resiliency, flexibility and strength of resinous thermoset phenolic products. The copolymer-diol dispersion is readily incorporated in the liquid phenolic resole compositions used to prepare phenolic foams, adhesives and coatings.

This invention relates to an improved phenol-formaldehyde resin composition and a process for its preparation. More particularly, it is related to a liquid thermosetting phenol-formaldehyde resole resin composition containing therein a minor amount of a compatible alkadiene-acrylamide copolymer. Such modified phenolic resole compositions give after curing thermoset resinous products having improved resiliency, flexibility and strength.

Phenolic resins have long been an important commercial material. Considerable research has been directed toward modifying these phenol-aldehyde resins to improve such properties as solubility, color, stability, strength, and flexibility. Incorporating or blending of small amounts of synthetic or natural rubbers with an uncured phenol-formaldehyde resin has often been recommended to improve flexibility and shock resistance of the cured product. However, the inherent incompatibility of many rubbery polymers and phenol-aldehyde resins has made careful formulation and blending techniques essential.

For example, Young and Newberg in United States Patent 2,657,185, describe blending of a copolymer of an alkadiene and an acrylonitrile with a modified phenolic resin obtained from a $C_{10}$–$C_{21}$ alkyl-substituted phenol by using a differential rolling mill to break down the rubbery copolymer and then to blend in the liquid or solid phenolic resin. Fisk and Meyer recommend in United States Patent 2,659,706 use of an immiscible hydrocarbon oil as a plasticizer to achieve a satisfactory blend of an uncured phenol-aldehyde novolac resin with a rubbery butadiene-acrylonitrile copolymer. The criticality of formulation is indicated by the failure of a standard phenolic foam formulation modified by incorporation of as little as 0.5 weight percent of a liquid butadiene-acrylonitrile rubber.

Although a number of other rubber-modified phenol-aldehyde resins have been described, liquid phenolic resole resin compositions containing a uniformly intermixed, compatible rubbery copolymer of alkadiene and acrylamide monomers have not been described. Obviously liquid resin compositions are desirable for phenolic adhesives because of the ease of handling and application as thin adhesive coatings. However, liquid phenolic compositions are even more essential in the preparation of phenolic foams which require that the initial resole resin be rapidly and thoroughly mixed with a blowing agent and catalyst, and then generally transferred from the mixer to the final mold before appreciable foaming occurs.

It has now been discovered that copolymer dispersions prepared by copolymerizing alkadiene and acrylamide monomers in a low molecular weight, liquid diol are compatible with liquid phenol-formaldehyde resole resins and can be readily and uniformly intermixed therewith. Furthermore, it has been discovered that modified liquid phenolic resole resins containing therein a minor amount of such an alkadiene-acrylamide copolymer give after curing thermoset resinous products having improved physical properties such as dimensional stability, resiliency, flexibility, and strength.

When this modified liquid phenol-formaldehyde resin composition is employed as an adhesive, greater flexibility and greatly improved bond strength are obtained. This modified liquid phenol-formaldehyde resin composition is particularly advantageously employed in the preparation of phenolic foams. Not only does incorporation of the copolymer improve the physical properties of the foam by decreasing the friability and brittleness, but also it most unexpectedly results in a finer and more uniform cell structure. Still other advantages will be evident from the further description of this invention.

Phenol-formaldehyde resin

In the practice of the present invention, any water-insoluble, liquid, thermosetting phenol-formaldehyde resin may be employed. In general such resins are prepared by condensation of one mole of a monohydric phenol with between 1.0 and 2.5 and preferably between 1.40 and 1.50 moles of formaldehyde until a water-insoluble, liquid condensation product is obtained. Although unsubstituted phenol is often preferred as the phenolic component, moderate amounts of other monohydric phenols containing at least one reactive aromatic position may also be incorporated in these resins.

Procedures for making such liquid phenol-formaldehyde condensation products are well known. Conveniently the condensation is initiated and continued under alkaline conditions using a catalyst such as a sodium hydroxide and a reaction temperature of from about 40° to 70° C. until a thin polymer solution having a viscosity of about 20–30 cps. at room temperature is obtained. The aqueous solution is then acidified and the condensation continued at 40°–70° C. until the desired water-insoluble, liquid phenolic resole resin is obtained. The viscous liquid product is separated from the aqueous phase, treated to neutralize the catalyst, and then washed thoroughly with water. The resulting liquid phenolic resole resin may contain a small amount of dissolved water, but this generally does not interfere with its subsequent use. If necessary, the residual water content can be reduced by such conventional means as distillation under reduced pressure.

For preparation of the modified phenolic resins described herein, it is preferable to use a water-insoluble liquid phenolic resole resin having a viscosity of from about 250 to 500 cps. at room temperature. However, liquid phenolic resole resins having a viscosity in the range from about 200 to 1,000 cps. or more are satisfactory.

Alkadiene-acrylamide copolymers

The emulsion polymerization of alkadienes, such as 1,3-butadiene, isoprene, and 2,3-dimethyl-1,3-butadiene, with acrylamides has been disclosed by Semon in United States Patent 2,401,885 and by Edwards et al. in British Patent 578,846. However, the rubbery alkadiene-acrylamide copolymers obtained from such emulsion copolymerizations are immiscible with liquid phenol-formaldehyde resole resins. No generally satisfactory means has been found to obtain the necessary uniform and stable dispersion of such emulsion copolymers in the liquid phenolic resole resin.

Thus, an essential feature of the present invention is the discovery that by copolymerization of alkadiene and acrylamide monomers dissolved in a low molecular weight, liquid diol, a colloidal copolymer dispersion is obtained which can be readily intermixed with the liquid phenolic resole resins to give improved liquid phenolic resin compositions.

More particularly, alkadiene-acrylamide copolymers suitable for use in the process of this invention are prepared by the addition polymerization of an alkadiene monomer selected from the group consisting of 1,3-butadiene, isoprene and 2,3-dimethyl-1,3-butadiene with an acrylamide monomer having the general formula:

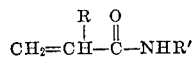

wherein R is H or $CH_3$ and R′ is H or a $C_1$–$C_4$ alkyl group, using as a polymerization medium a liquid diol selected from the group consisting of: $C_2$–$C_6$ alkylene glycols, and liquid polyalkyleneoxydiols having an average molecular weight of less than 650 and the formula: $HO(C_aH_{2a}O)_nH$ wherein $a$ is 2 or 3, and $n$ is the average number of alkyleneoxy groups in the polymer. Mixtures of these alkylene glycols and polyalkyleneoxydiols can also be used.

Although alkadiene-acrylamide copolymers can be prepared from monomeric mixtures containing from about 5 to 95 percent of the alkadiene monomer and a complementary amount of from about 95 to 5 percent of the acrylamide monomer, copolymers containing at least 50 percent by weight of polymerized alkadiene are required to prepare modified resole resins having the improved properties described. Particularly desirable copolymers are obtained from a monomeric mixture consisting essentially of from 50 to 90 weight percent of 1,3-butadiene and from 50 to 10 weight percent of acrylamide or methacrylamide.

As the liquid diol polymerization medium, ethylene glycol or diethylene glycol is preferred. Other alkylene glycols, such as 1,4-butanediol and 1,6-hexanediol, and low molecular weight polyethyleneoxy or polypropyleneoxydiols can also be used. However, the viscosity of polalkyleneoxydiols having a molecular weight greater than about 650 is higher than desirable for efficient polymerization and dispersion of the resulting copolymers. Furthermore, the presence of high molecular weight polyalkyleneoxydiols in the modified phenolic resin compositions is not desirable, particularly in compositions to be used in the preparation of phenolic foams.

In practice the desired copolymerization is readily achieved by adding from about 0.05 to 2.0 parts of a conventional additional polymerization catalyst such as potassium persulfate, t-butylhydroperoxide or azobisisobutyronitrile, to a solution of 100 parts of mixed alkadiene-acrylamide monomers in 100 to 500 parts of the liquid diol. Emulsifying and suspending agents are not usually required as the diol diluent itself is an extremely effective polymerization medium.

Polymerization is achieved by agitating the diol mixture at a temperature in the range from 20° to 120° C. for a time sufficient to obtain the desired copolymer. As polymerization proceeds, the viscosity of the mixture increases and a cloudy colloidal dispersion of the copolymer is formed. A typical copolymer-diol dispersion suitable for use in preparing a modified phenolic resin has a Brookfield viscosity of 3000 to 20,000 cps. at 25° C. with a solids content of about 20 to 40 weight percent. The preferred polymerization conditions and the time required to achieve the desired polymerization will, of course, depend upon the particular reactants and catalysts employed. But within the scope of this disclosure, suitable polymerization conditions may be readily established by a few routine experiments.

In this system the alkadiene monomer polymerizes more readily than the acrylamide. For example, polymerization of a 50/50 weight percent mixture of 1,3-butadiene/acrylamide in ethylene glycol at 70° C. gave a copolymer containing about 75 weight percent polymerized butadiene and 25 weight percent polymerized acrylamide. About 90 percent of the charged butadiene was consumed, but only about 30 percent of the acrylamide.

When the desired polymerization has been obtained, the unreacted alkadiene is generally removed by evaporation to give a stable diol-copolymer dispersion which may be used directly without further treatment in the preparation of modified liquid phenolic resin compositions. The dispersion is compatible with liquid phenol resole resins and readily intermixes to give a uniform blend of the copolymer with the phenolic resin. Residual acrylamide monomer in the copolymer dispersion is not detrimental as it is consumed during the final cure of the modified phenolic resin. Also in the amounts normally present, the low molecular weight diol is not detrimental in the resin compositions.

Although the alkadiene-acrylamide copolymer can be recovered from the diol dispersion by coagulation with water, it is not desirable in the practice of the invention. The isolated rubbery copolymer is not easily mixed with liquid phenolic resins and redispersion is difficult.

*Modified phenolic resin compositions*

In the prepartion of liquid phenolic resin compositions modified by incorporating an alkadiene-acrlyamide copolymer-diol dispersion, it is particularly advantageous to employ a dispersion containing at least 10 weight percent, and preferably from about 20 to 50 weight percent of copolymer solids, to avoid addition of excessive amounts of the diol dispersant. Particularly in liquid compositions to be used for phenolic foams, excessive amounts of diol can be detrimental to the physical properties, such as viscosity, required for preparation of a satisfactory foam.

The alkadiene-acrylamide copolymer dispersions are compatible with liquid phenolic resole resins in a wide range of relative proportions. Satisfactory mixing to obtain a uniform and stable modified phenolic resin composition is readily obtained by conventional means at room temperature. Usually stirring the two components together for a few minutes is adequate. Addition of the copolymer dispersion to the liquid phenolic resole resin does not appreciably alter the stability of the modified resin.

To achieve the desired enhanced properties in the final cured phenolic resin product, only a relatively small amount of the copolymer/diol dispersion is required. Significantly improved properties are obtained using as little as 1 weight percent, based on the phenolic resole resin, of a dispersion containing from 20 to 50 weight percent copolymer solids. For most purposes a modified phenolic resole composition containing from about 5 to 10 weight percent of the copolymer-diol dispersion, i.e., from about 1 to 5 weight percent of copolymer solids is preferred. At times a higher amount of up to about 20 percent of the copolymer dispersion may be advantageous.

The modified pehnolic resin compositions can be formulated as desired with many conventional additives, mixed with standard catalysts, and then cured to give thermoset phenolic resinous products having improved resiliency, strength, and stability. The mechanism by which these improved properties are obtained is not understood. Obviously, some of the mechanical properties of the alkadiene-acrylamide copolymer are incorporated into the molecule. But furthermore, there is some evidence that during the curing process the copolymer is chemically bonded within the resinous matrix through interaction of the amide and methylol groups with a consequent increase in stability of the cured product. These modified compositions can be advantageously employed in the preparation of a great variety of resinous phenolic products such as castings, adhesive joints, foams, coatings, etc.

Additives such as sand, clay, carbon black, fiberglass and pigments are readily used in casting resin formulations with the modified phenolic resins. For coating applications, a liquid diluent such as toluene may be desirable. In preparing phenolic foams blowing agents such as steam, carbon dioxide, or nitrogen formed in situ by chemical or thermal action can be used. Preferably, however, low boiling liquids, such as aliphatic hydrocarbons, fluorocarbons, or ethers, having a boiling point in the range from about 20° to 100° C. are used to obtain lower density phenolic foams.

The modified phenolic resin compositions containing other desired additives are readily cured by standard techniques. Usually an acidic catalyst is employed as a hardening agent. Strong inorganic acids as hydrochloric, sulfuric, or phosphoric acids are highly effective. At times a somewhat slower cure is advantageous, particularly in the preparation of phenolic foams where foam expansion of the foam must be obtained before the resin becomes thermoset. As a somewhat less active catalyst, an aromatic sulfonic acid or sulfonyl chloride such as p-toluenesulfonic acid or benzenesulfonyl chloride, is often used. In some applications a mixture of an aromatic sulfonic acid and a di- or trichloroacetic acid is particularly effective.

In summary, the present invention relates to an improved liquid phenol-formaldehyde resole resin composition having incorporated therein a minor amount of an alkadiene-acrylamide copolymer prepared by addition polymerization in a liquid diol medium. Such a modified liquid phenol-formaldehyde resin composition is advantageously employed in the preparation of numerous resinous phenolic products having improved resiliency, flexibility, strength, and stability.

In order that those skilled in the art may better understand how the present invention can be effected and the advantages obtained therefrom, the following examples are given by way of illustration without limitation of the invention thereto. Unless otherwise stated, all parts and percentages are by weight.

EXAMPLE 1

*Liquid phenol-formaldehyde resole resin*

To a mixture of 941 parts (10 moles) of phenol and 1150 parts (14.2 moles) of 37% aqueous formaldehyde heated to about 45° C. was slowly added 26.3 parts (0.66 mole) of sodium hydroxide. Then over a period of about an hour the temperature of the reaction mixture was increased slowly to about 65° C. Heating was continued at 60°–65° C. for another 4 hours before cooling the mixture to about room temperature. At this point the polymer was still water-soluble and the aqueous polymer solution had a room temperature viscosity of about 20 cps.

To the stirred aqueous resin mixture at room temperature was slowly added 213 parts (0.65 mole) of 30% sulfuric acid. Polymerization was allowed to continue for another 3 to 4 hours at about 40° C. until a viscous water-insoluble liquid resole resin was obtained. After discarding the aqueous phase, the pH of the liquid phenol-formaldehyde resin was adjusted to between 5 and 7 with dilute caustic. Then the resinous product was washed thoroughly with water. The resulting water-insoluble liquid resin contained from 5 to 10% residual dissolved water. It had a room temperature viscosity between about 200 and 500 cps.

EXAMPLE 2

*Butadiene-acrylamide copolymer*

(A) A mixture of 20 parts of 1,3-butadiene, 20 parts of crystalline acrylamide, 0.2 part of potassium persulfate, and 110 parts of ethylene glycol was placed in a sealed glass pressure bottle and shaken for 18 hours in a constant temperature bath at 70° C. The mixture was then cooled to room temperature and the bottle vented to release unreacted butadiene. The residual cloudy ethylene glycol dispersion of the butadiene-acrylamide copolymer had a Brookfield viscosity at 25° C. of about 10,000 cps.

The copolymer composition was determined by analyzing a sample of the glycol dispersion for residual unreacted acrylamide and also by a nitrogen analysis of a copolymer sample obtained by coagulation of a portion of the glycol dispersion with water. Based on residual acrylamide monomer, the copolymer contained 77 wt. percent polymerized butadiene and 23 wt. percent polymerized acrylamide. From the nitrogen analysis of the isolated polymer, the copolymer contained 80 wt. percent polymerized butadiene and 20 wt. percent polymerized acrylamide. About 90% of the charged butadiene was polymerized.

(B) In a similar manner a butadiene-acrylamide copolymer dispersion in diethylene glycol was prepared from a mixture of 30 parts of butadiene, 30 parts of acrylamide, 120 parts of diethylene glycol, and 0.3 part of potassium persulfate. By analysis the polymeric product contained 75 wt. percent polymerized butadiene.

(C) Other butadiene-acrylamide copolymers containing from 75 to 90 wt. percent of polymerized butadiene have been prepared using ethylene glycol, diethylene glycol, or a polyethyleneoxydiol having an average molecular weight of 600 as a polymerization medium. Propylene glycol and low molecular weight polypropyleneoxydiols are also suitable as a polymerization medium.

EXAMPLE 3

*Phenolic foams*

To a mixture of 100 parts of the phenol-formaldehyde resole resin described in Example 1, 10 parts of the butadiene-acrylamide copolymer dispersion in diethylene glycol described in Example 2B, and 10 parts of 1,1,2-trichloro-1,2,2-trifluoroethane ("Freon 113" fluorocarbon from du Pont) in a resin cup was added with stirring 10 parts of an equimolar mixture of p-toluenesulfonic acid and trichloroacetic acid. The resin cup was then placed in an oven held at about 85° C. After an hour the cured foam sample was removed. The foam had a fine uniform pore structure, a density of 2.1 pounds per cubic foot, and a displacement flexibility of 0.3 inch.

This displacement flexibility was measured using standard test specimens having a square ⅜ x ⅜ inch, cross-sectional area and a length of 1.5 to 2 inches. These pieces were individually tested by clamping in a holder so that one inch of the piece projects beyond the edge of the clamp. The tip of the free end of the test piece was then slowly deflected in a direction perpendicular to the length of the piece until the sample broke. The deflection of the tip at the time of the break is then a measure of the flexibility of the test piece. For each foam several test specimens are used to obtain an average value of this flexibility.

A phenolic foam prepared in an identical manner but without addition of the glycol copolymer additive gave a phenolic foam having a density of 6.0 pounds per cubic foot and a flexibility of 0.2 inch. The cell structure of this foam was quite irregular and the foam was considerably more brittle and fragile than the foam prepared from the modified resin containing the butadiene-acrylamide copolymer.

EXAMPLE 4

*Phenolic adhesives*

A phenolic adhesive was prepared by mixing 100 parts of a phenol-formaldehyde resole resin with 10 parts of the butadiene-acrylamide copolymer dispersion in ethylene glycol (Example 2A) and 4 parts of benzenesulfonyl chloride. A control adhesive was prepared concurrently using 100 parts of the same resole resin and 4 parts of benzenesulfonyl chloride.

The comparative adhesive strength of these two resins was evaluated by preparing one inch glue lap joints using standard oak test strips (½ x 1 x 8 inches). Three joints were prepared with each resin by applying a thin coating of the resin to one end of the test strip and positioning the second test piece so that there was a one inch glue lap joint. Each joint was then clamped securely and cured by heating overnight in an oven held at 75° C.

The adhesive strength of the cured joints was determined with an Instron test machine. The control samples had an average break strength of 800 p.s.i. In contrast, none of the glue joints prepared from the butadiene-acrylamide copolymer modified resin failed at the maximum test limit of 1000 p.s.i.

EXAMPLE 5

*Casting resins*

Using a standard formulation:
100 parts of liquid phenol-formaldehyde resole resin,
10 parts of butadiene-acrylamide copolymer dispersion, and
4 parts of benzenesulfonyl chloride, modified phenolic resole resin compositions were prepared from several copolymer dispersions containing about 20 wt. percent copolymer solids in ethylene glycol.

Test sheets of each modified resin were prepared by casting a thin 0.140 inch coating of resin on a glass plate and allowing the casting to cure at room temperature for at least 2 weeks. Then standard test strips were cut from each cured sheet and used to measure the flex strength by standard methods. The test results such as those shown in Table 1 indicate that addition of the butadiene-acrylamide copolymer enhances the flex strength of the cured phenolic resin.

TABLE 1
[Phenolic casting resin]

| Resin | B/A Copolymer [1] | Flex Strength, p.s.i. |
|---|---|---|
| 4-1 | None | 4,300 |
| 4-2 | 89/11 | 6,400 |
| 4-3 | 75/25 | 7,300 |

[1] Wt. percent polymerized 1,3-butadiene/wt. percent polymerized acrylamide.

I claim:
1. In a liquid thermosetting phenol-formaldehyde resole resin composition, the improvement which consists essentially of incorporating therein about 0.5–10 weight percent based on phenolic resin of a rubbery $C_4$–$C_6$ alkadiene-acrylamide copolymer dispersed in a liquid diol, said copolymer dispersion being prepared by the addition polymerization of
    (A) About 50–95 weight percent of $C_4$–$C_6$ alkadiene monomer selected from the group consisting of 1,3-butadiene, isoprene and 2,3-dimethyl-1,3-butadiene, and
    (B) A complementary amount of about 50–5 weight percent of an acrylamide monomer having the formula:

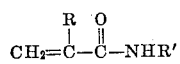

wherein R is H or $CH_3$ and R' is H or $C_1$–$C_4$ alkyl, in
    (C) A liquid diol selected from the group consisting of $C_2$–$C_6$ alkylene glycols and liquid polyalkyleneoxydiols of the formula:

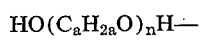

wherein each $a$ is 2 or 3 and $n$ is a number such that the diol has a molecular weight of less than 650.
2. The phenolic resole composition of claim 1 wherein the copolymer dispersion consists essentially of about 10–50 weight percent of copolymerized 1,3-butadiene and acrylamide in the liquid diol.
3. The phenolic resole composition of claim 1 wherein the alkadiene monomer is 1,3-butadiene.
4. The phenolic resole composition of claim 1 wherein the acrylamide monomer is acrylamide.
5. The phenolic resole composition of claim 1 wherein the liquid diol is ethylene glycol.
6. The phenolic resole composition of claim 1 wherein the liquid diol is diethylene glycol.
7. A liquid copolymer dispersion comprising about 10–50 weight percent of a rubbery $C_4$–$C_6$ alkadiene-acrylamide copolymer dispersed in a liquid diol, said copolymer dispersion being prepared by the addition polymerization of
    (A) About 50–95 weight percent of a $C_4$–$C_6$ alkadiene monomer selected from the group consisting of 1,3-butadiene, isoprene and 2,3-dimethyl-1,3-butadiene, and
    (B) A complementary amount of about 50–5 weight percent of an acrylamide monomer having the formula

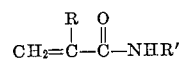

wherein R is H or $CH_3$ and R' is H or $C_1$–$C_4$ alkyl, in
    (C) A liquid diol selected from the group consisting of $C_2$–$C_6$ alkylene glycols and liquid polyalkyleneoxydiols of the formula:

wherein each $a$ is 2 or 3 and $n$ is a number such that the diol has a molecular weight of less than 650.
8. The liquid composition of claim 7 wherein the monomers are 1,3-butadiene and acrylamide.
9. The liquid composition of claim 8 wherein the liquid diol is ethylene glycol.
10. The liquid composition of claim 8 wherein the liquid diol is diethylene glycol.
11. In a process for preparing a thermoset phenolic foam from a liquid phenol-formaldehyde resole resin composition containing a blowing agent and an aromatic sulfonic acid catalyst, the improvement which consists essentially of incorporating therein about 0.5–10 weight percent based on phenolic resin of a rubbery $C_4$–$C_6$ alkadiene-acrylamide copolymer dispersed in a liquid diol, said copolymer dispersion being prepared by the addition polymerization of
    (A) About 50–95 weight percent of a $C_4$–$C_6$ alkadiene monomer selected from the group consisting of 1,3-butadiene, isoprene and 2,3-dimethyl-1,3-butadiene, and
    (B) A complementary amount of about 50–5 weight percent of an acrylamide monomer having the formula:

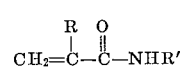

wherein R is H or $CH_3$ and R' is H or $C_1$–$C_4$ alkyl, in
    (C) A liquid diol selected from the group consisting of $C_2$–$C_6$ alkylene glycols and liquid polyalkyleneoxydiols of the formula:

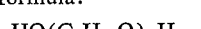

wherein each $a$ is 2 or 3 and $n$ is a number such that the diol has a molecular weight of less than 650.
12. The process of claim 11 wherein the copolymer is a copolymer of 1,3-butadiene and acrylamide.
13. A thermoset phenolic foam having incorporated therein from about 0.5–10 weight percent based on phenolic resin of a rubbery $C_4$–$C_6$ alkadiene-acrylamide copolymer dispersed in a liquid diol, said copolymer dispersion being prepared by the addition polymerization of
    (A) About 50–95 weight percent of a $C_4$–$C_6$ alkadiene monomer selected from the group consisting of 1,3-butadiene, isoprene and 2,3-dimethyl-1,3-butadiene, and
    (B) A complementary amount of about 50–5 weight percent of an acrylamide monomer having the formula:

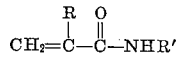

wherein R is H or $CH_3$ and R' is H or $C_1$–$C_4$ alkyl, in
(C) A liquid diol selected from the group consisting of $C_2$–$C_6$ alkylene glycols and liquid polyalkyleneoxydiols of the formula:

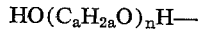

wherein each $a$ is 2 or 3 and $n$ is a number such that the diol has a molecular weight of less than 650.

14. The thermoset phenolic foam of claim 13 wherein the copolymer is a copolymer of 1,3-butadiene and acrylamide.

15. In a liquid thermosetting phenolic adhesive composition containing a liquid phenol-formaldehyde resole resin and an aromatic sulfonic acid catalyst, the improvement which consists essentially of incorporating therein from about 0.5–10 weight percent based on phenolic resin of a rubbery $C_4$–$C_6$ alkadiene-acrylamide copolymer dispersed in a liquid diol, said copolymer dispersion being prepared by the addition polymerization of
(A) About 50–95 weight percent of a $C_4$–$C_6$ alkadiene monomer selected from the group consisting of 1,3-butadiene, isoprene and 2,3-dimethyl-1,3-butadiene, and
(B) A complementary amount of about 50–5 weight percent of an acrylamide monomer having the formula:

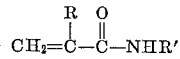

wherein R is H or $CH_3$ and R' is H or $C_1$–$C_4$ alkyl, in
(C) A liquid diol selected from the group consisting of $C_2$–$C_6$ alkylene glycols and liquid polyalkyleneoxydiols of the formula:

wherein each $a$ is 2 or 3 and $n$ is a number such that the diol has a molecular weight of less than 650.

16. The liquid phenolic adhesive of claim 15 wherein the copolymer is a copolymer of 1,3-butadiene and acrylamide.

References Cited
UNITED STATES PATENTS

| | | | |
|---|---|---|---|
| 2,657,185 | 10/1953 | Young et al. | 260—17.2 |
| 3,145,194 | 8/1964 | Heckmaier et al. | 260—79.3 |
| 3,262,897 | 7/1966 | Kordzinski et al. | 260—33.4 |

MORRIS LIEBMAN, *Primary Examiner.*

R. BARON, *Assistant Examiner.*